United States Patent [19]

Ohlswager et al.

[11] 4,293,025

[45] Oct. 6, 1981

[54] METHOD AND APPARATUS FOR THE DISTRIBUTION OF LIQUID-VAPOR MIXTURE

[75] Inventors: Stanley Ohlswager; Robert R. Edison, both of Olympia Fields; Thorpe Dresser, Markham, all of Ill.

[73] Assignee: Atlantic Richfield Company, Philadelphia, Pa.

[21] Appl. No.: 1,981

[22] Filed: Jan. 8, 1979

Related U.S. Application Data

[60] Division of Ser. No. 561,441, Mar. 24, 1975, Pat. No. 4,140,178, and a continuation-in-part of Ser. No. 399,204, Sep. 20, 1973, Pat. No. 3,899,000.

[51] Int. Cl.[3] ........................ F28F 9/22; B01D 45/08; F25B 39/04

[52] U.S. Cl. .................................. 165/1; 137/561 R; 55/465; 55/186; 55/193; 165/161; 62/525

[58] Field of Search ................. 55/465, 186, 193, 202, 55/206; 137/561 R, 561 A; 165/161, 1

[56] References Cited

U.S. PATENT DOCUMENTS

| | | | |
|---|---|---|---|
| 1,223,101 | 4/1917 | Pacziga | 55/186 |
| 2,110,430 | 3/1938 | Swanson | 137/561 A |
| 2,168,404 | 8/1939 | Grant | 62/525 |
| 2,278,798 | 4/1942 | Riccarde | 55/465 |
| 2,672,374 | 3/1954 | Norris | 55/465 |
| 3,292,913 | 12/1966 | Craig | 55/465 |
| 3,395,730 | 8/1968 | Mennesson | 137/561 R |
| 3,606,738 | 9/1971 | Kraus | 55/465 |
| 3,795,259 | 3/1974 | Brandin | 137/561 A |
| 3,899,000 | 8/1975 | Ohlswager | 137/561 A |
| 3,923,480 | 12/1975 | Visch | 55/465 |

*Primary Examiner*—P. S. Lall

*Attorney, Agent, or Firm*—John B. Goodman

[57] ABSTRACT

An apparatus for distributing a liquid-vapor mixture into two or more separate streams or paths involving a hollow vessel having a fluid inlet means; at least two pipe means each of which have one end extending into the vessel, each pipe means being in fluid communication with a different pass of a heat-exchanger system having at least two passes, each pipe means providing a different path for liquid-vapor flow from the hollow vessel; at least one aperture in that part of each of the pipe means extending into the vessel and restrictive means located in the vessel to restrict fluid flow directly into the top openings of the pipe means. In an additional embodiment, each of the pipe means is in fluid communication with a different chemical reaction zone.

Improved methods of distributing a liquid-vapor mixture are also disclosed.

22 Claims, 6 Drawing Figures

METHOD AND APPARATUS FOR THE DISTRIBUTION OF LIQUID-VAPOR MIXTURE

This is a division of application Ser. No. 561,441 filed Mar. 4, 1975, now U.S. Pat. No. 4,140,178 and a continuation-in-part of application Ser. No. 399,204, filed Sept. 20, 1973, now U.S. Pat. No. 3,899,000.

This invention relates to an improved apparatus and method for distributing material into at least two separate streams. More particularly, the invention relates to an improved apparatus and method for distributing a fluid comprising a liquid-vapor mixture into at least two separate streams for improved processing downstream, e.g., through a multi-pass heat exchanger system used, for example, in a hydrocarbon conversion process.

In many instances throughout industry, it is advantageous to distribute a mass of material into two or more separate streams for further processing. For example, if a chemical reactor system comprises two or more reactors in parallel, the reactants, e.g., a liquid-vapor mixture, should be distributed among the various reactors to provide for effective operation, e.g., desired conversion levels, catalytic activities, flow rates, reactant compositions and the like. Other situations exist wherein it would be advantageous to provide improved distribution of a fluid comprising a liquid-vapor mixture into two or more separate streams.

For example, many industrial processes involve the unit operation of heat exchange. In certain instances, great bulks of material are heat exchanged against other great bulks of material to attain proper temperatures and enthalpy contents. Also, large masses of materials may be heated by, for example, natural gas and the like, in direct fired heaters. In each of these instances of heat exchange, it may become desirable to process one or more of the streams to be heat exchanged through the heat exchange apparatus in two or more parallel passes. Thus, for example, to minimize the pressure drop through the heat exchange equipment, one or more of the streams entering the heat exchanger system is divided into two or more streams each of which then proceeds along a separate route, e.g., in one or more tubes, through the heat exchanger. Each of these separate routes may be termed a "pass" of the heat exchanger system.

One problem which arises in using such multi-pass heat exchangers involves proper distribution of the material, in particular, mixtures of liquid and vapor, among the various passes. If the material to be heat-exchanged is improperly distributed among the various heat exchanger passes, heat exchanger efficiency may be reduced and in certain instances, e.g., in multi-pass direct fired heaters, damage to or destruction of the heat exchange equipment can result. This distribution problem is of particular importance when the material in the two or more passes of the heat exchanger system is a fluid comprising both a liquid, especially a major portion by weight of liquid, which, for example, is to be at least partially vaporized in the heat exchanger, and a vapor. Prior art methods of distributing liquid-vapor mixtures into two or more streams involve complicated valve systems which require careful control and which, because of their complexity, often require frequent maintenance resulting in process downtime. Therefore, it would be advantageous to provide improved means for distributing a mass of fluid comprising both liquid and vapor into two or more streams for further processing, e.g., in the various passes of a multi-pass heat exchanger system.

It is an object of the present invention to provide an improved apparatus for distributing a mass of fluid comprising a liquid-vapor mixture to two or more separate streams.

Another object of the present invention is to provide an improved method for distributing a mass of fluid comprising a liquid-vapor mixture to two or more separate streams.

A still further object of the present invention is to provide an improved apparatus and method for distributing a mass of fluid comprising a liquid-vapor mixture to two or more separate streams wherein the apparatus is in fluid communication with a multi-pass heat exchanger system and/or different chemical reaction zones. Other objects and advantages will become apparent hereinafter.

An improved apparatus for distributing a fluid comprising both a liquid, preferably a major portion by weight of liquid, and a vapor, preferably at least about 20% and more preferably at least about 50% by volume of vapor, to two or more separate streams, e.g., each of which flows through a different pass of a heat exchanger system having at least two passes has now been discovered. The apparatus comprises:

1. a hollow vessel having at least one fluid inlet means;

2. at least two hollow pipe means each having a top opening located at a first end of the pipe means which extends into the vessel, each of these pipe means providing outlet means from the vessel for a different portion of the fluid, each of the pipe means being in fluid communication with a different pass of the heat exchanger system;

3. at least one aperture located in that part of each pipe means extending into the vessel below the first end of the pipe means and below the liquid level to provide fluid communication betwen the interior of the vessel and the hollow space of the pipe means; and 4. restrictive means located at a level above the top openings of the pipe means to restrict the flow of at least a portion of, preferably substantially all of, the fluid from the fluid inlet means directly into the hollow space of the pipe means through the top openings of the pipe means.

In an additional embodiment of the present invention, each of the pipe means of the present apparatus is in fluid communication with a different chemical reaction zone through which fluid is to be distributed. Thus, the present apparatus provides improved liquid-vapor distribution through (1) a heat exchanger system having at least two passes, (2) a plurality of chemical reaction zones or both (1) and (2). In addition, both heat exchange and chemical reaction may occur in the same piece of equipment and this feature is included within the scope of the present invention.

The fluid inlet means is preferably located at a level above the top openings of the pipe means and, more preferably, also at a level above the restrictive means so that the fluid comprising a liquid-vapor mixture to be distributed flows in a generally downwardly direction toward the restrictive means. The hollow vessel may be of any suitable size and geometry. For convenience and ease of fabrication, the fluid inlet means preferably has a circular configuration, although this means may have any suitable size and geometry. The hollow pipe means may have any suitable geometry, although it is preferred that the top opening of each such pipe means be circular in configuration. It is preferred that the cross sectional area of the top opening of each holow pipe means be of uniform size. The cross section size of the top opening of each hollow pipe means can vary over a broad range and depends on various factors, for example, the fluid rate and fluid composition, e.g., percent vapor in the fluid. The total length of each pipe means preferably should be substantially uniform, although this may be impossible to achieve due, for example, to the location, size, configuration and the like of the equipment, e.g., heat exchanger system and/or chemical reaction zones, through which the fluid is to be distributed. Also, it is preferred that each pipe means extend into the vessel so that the top openings of the pipe means are at a substantially uniform horizontal level.

At least one, and preferably from 1 to about 20, apertures are located in that part of each pipe means extending into the vessel below the first end of the pipe means. Although these apertures may be of any suitable geometry, it is preferred that they be circular in configuration. It is preferred that if more than one aperture is used, that the apertures be evenly spaced around the periphery of the pipe means at a substantially uniform horizontal level, although a vertical array of apertures can be used. The number, as well as the size, of these apertures depend on various factors, for example, the liquid rate into the vessel. For example, if the liquid rate varys substantially from time to time and/or is such that it cannot be accomodated by one row of apertures, two or more such rows may be utilized.

The present apparatus includes restrictive means located at a level above the top openings of the pipe means, preferably at a level between the fluid inlet means and the top opening of the pipe means, to restrict the flow of at least a portion, and preferably substantially all of, the fluid from the fluid inlet means directly through the top openings of the pipe means. In many instances, this restrictive means comprises what is commonly referred to as a "splash baffle". This splash baffle is located above the top openings of the pipe means and between the pipe means and fluid inlet means. At least a portion of the fluid entering the vessel through the fluid inlet means impinges upon the splash baffle and is thereby restricted from entering the top openings of the pipe means directly from the fluid inlet means.

In a preferred embodiment, the apparatus of the present invention further comprises plate means located at a level above the top openings of the pipe means, preferably at a level between the top opening of the pipe means and the restrictive means, to further restrict the flow of fluid directly into the top openings of the pipe means.

From the above description, it is clear that the size of the present apparatus is not critical to the present invention. Typically, the hollow vessel has an interior volume of from about 2 cubic feet to about 4000 cubic feet or more and is preferably cylindrical in shape with an inner diameter in the range of from about 1 foot to about 20 feet or more. The part of the pipe means extending into the vessel is typically from about 1 foot to about 15 feet, preferably from about 2 feet to about 6 feet, in length. These pipe means terminate in top openings which are spaced, preferably substantially evenly, across the cross section of the hollow vessel. The top opening of each pipe means typically has a cross sectional area in the range from about 1 inch$^2$ to about 120 inches$^2$ or more, preferably from about 5 inches$^2$ to about 60 inches$^2$. The part of the pipe means extending into the vessel is preferably cylindrical in configuration having a circular top opening.

The center of the aperture or apertures located in that part of each of the pipe means extending into the vessel is typically from about 0.5 feet to about 10 feet, preferably from about 1 foot to about 4 feet, below the top opening of the pipe means. Each of the apertures may have a cross sectional area in the range from about 0.05 inch$^2$ to about 3.0 inches$^2$, preferably from about 0.10 inch$^2$ to about 1.0 inch$^2$. If a pipe means is provided with more than one aperture, the apertures are preferably substantially evenly spaced around the periphery of the pipe means. It is preferred that all the apertures located in all the pipe means be of a substantially uniform size and at a substantially uniform horizontal level.

The restrictive means is typically located from about 0.5 feet to about 10 feet, preferably from about 1 foot to about 6 feet, above the top openings of the pipe means. In many instances, the restrictive means has a cross sectional area at least as large, and preferably at least about twice as large, as the total area of the top openings of the pipe means.

The optional plate means is typically located from about 0.1 inch to about 1 foot, preferably from about 2 inches to about 6 inches, above the top openings of the pipe means. In one embodiment, portions of the plate means are supported by the individual hollow pipe means above the top opening of that pipe means. In this embodiment, the plate means typically has a cross sectional area at least as large, preferaby at least about twice as large, as the top opening of the pipe means above which it is supported.

In a further embodiment, the plate means comprises a perforated tray supported above the top openings of the pipe means. Thus, the solid portion of the perforated tray further restricts the flow of fluid directly into the top openings of the pipe means. This perforated tray includes at least one perforation which permits the fluid to flow therethrough. The perforations, preferably circular in shape, preferably comprise from about 10 percent to about 50 percent of the total cross sectional area encompassed by the perforated tray. This embodiment is particularly preferred when the apparatus of the present invention comprises at least four hollow pipe means.

In an additional embodiment the part of the pipe means extending into the hollow vessel may be provided with "weep holes", i.e., small orifices located at or near the junction or junctions where the pipe means exit the vessel. These weep holes, typically from about 0.01 inch$^2$ to about 0.2 inch$^2$ in cross sectional area, provide an alternate path for a small amount of liquid, e.g., less than about 20% and preferably less than about 10% of the total liquid, from the vessel into the two or more separate streams, e.g., to different passes of a heat exchanger system and/or different chemical reaction zones.

The apparatus of the present invention may be fabricated from any suitable material of construction. The material of construction used is dependent upon the particular application involved. In many instances metals and metal alloys, such as iron, carbon steel or stainless steel, copper and the like, may be used. Of course, the apparatus should be made of a material or combination of materials which is substantially unaffected by the fluid and the conditions, e.g., temperatures, pressures and the like, at which the apparatus is normally operated. In addition, such material or materials should have no substantial detrimental effect on the fluid being processed.

Figure 5:
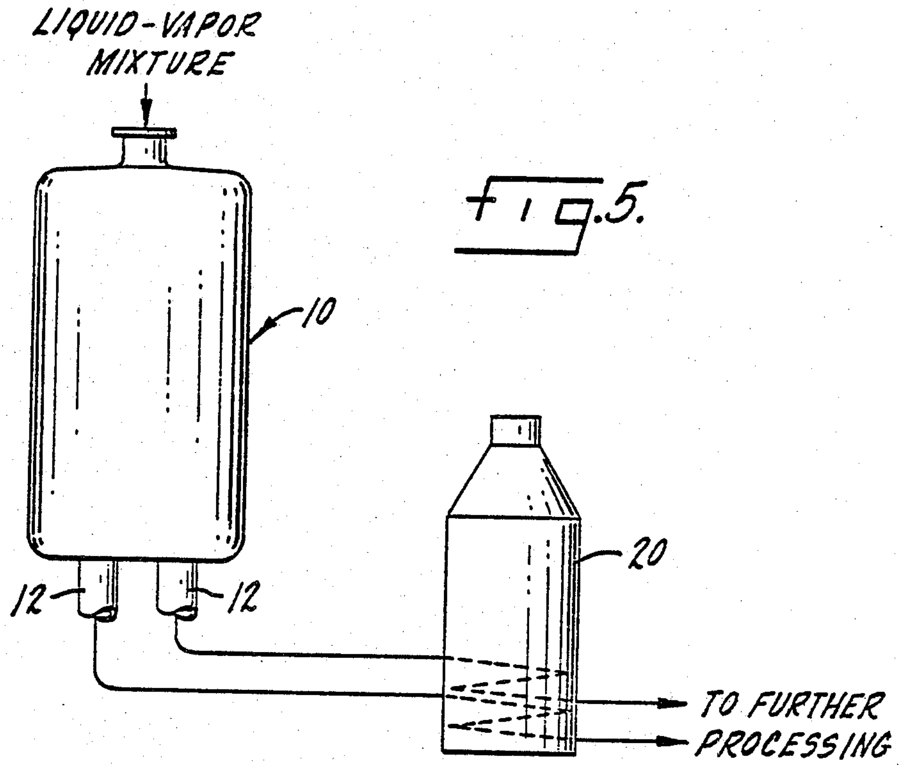
FIG. 5 is a schematic diagram showing one embodiment of the present invention.
Figure 6:
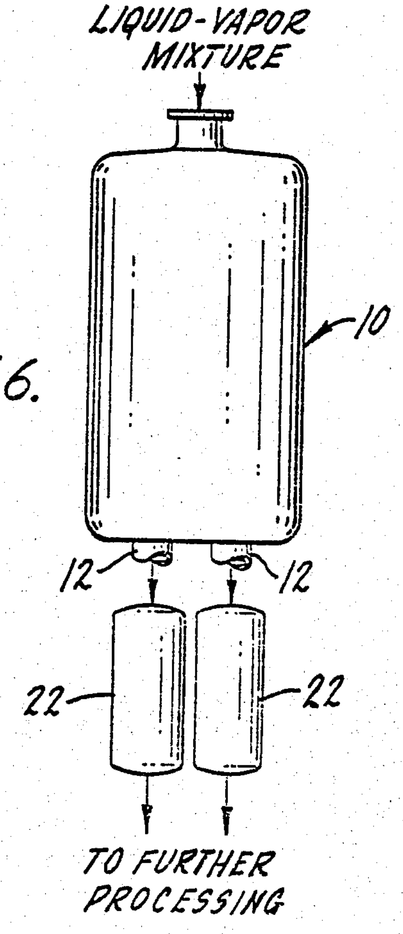
FIG. 6 is a schematic diagram of another embodiment of the present invention.

Referring now to the drawings, hollow vessel 10 is equipped with fluid inlet means 11. The embodiment illustrated in FIG. 5 distributes fluid to a two pass direct fired heater and, therefore, the apparatus includes two pipe means 12 each in fluid communication with a different pass of the direct fired heater 20. Although the present invention finds particular applicability in distributing fluid through multi-pass heat exchanger systems, it is useful in distributing fluid comprising liquid and vapor into two or more separate streams for processing by other equipment, such as chemical reactors, distillation columns and the like. In the embodiment illustrated in FIG. 6, each of the pipe means 12 is in fluid communication with a different chemical reaction zone 22.

Figure 2:
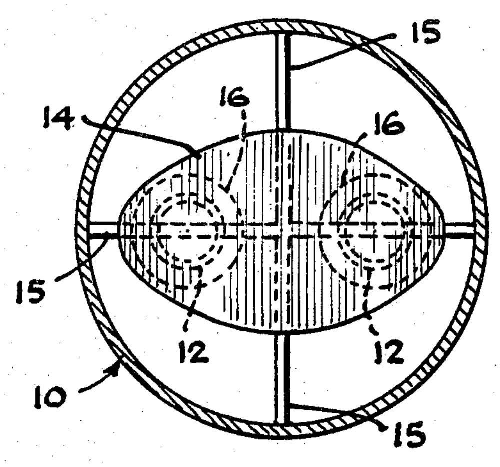
FIG. 2 is a top sectional view along line 2—2 of FIG. 1.
Figure 1:
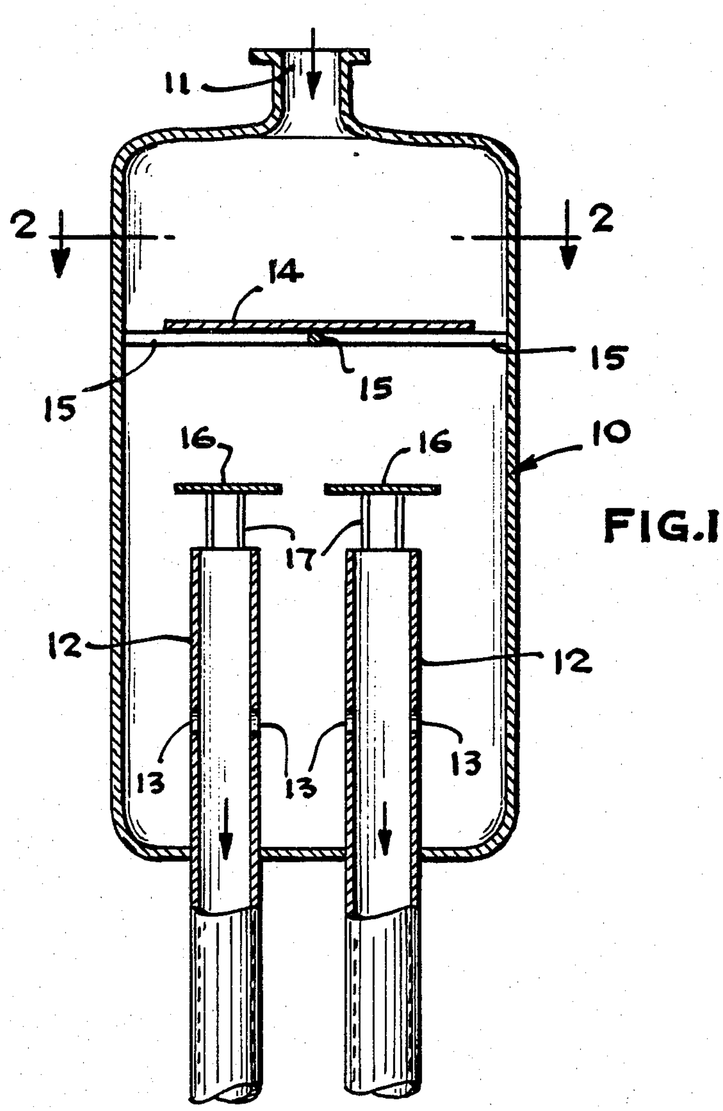
FIG. 1 is a side elevational view in section of one embodiment of the apparatus of the present invention.

Referring now to FIGS. 1 and 2, a splash baffle 14, held in position by support bars 15 is located between the inlet means 11 and the top openings of pipe means 12. Apertures 13 in each pipe means 12 provide fluid communication between the interior of hollow vessel 10 and the hollow space of pipe means 12. In the embodiment shown in FIGS. 1 and 2, plate means 16 supported by support columns 17 further restrict fluid from entering the top opening of pipe means 12 directly from inlet means 11.

Figure 3:
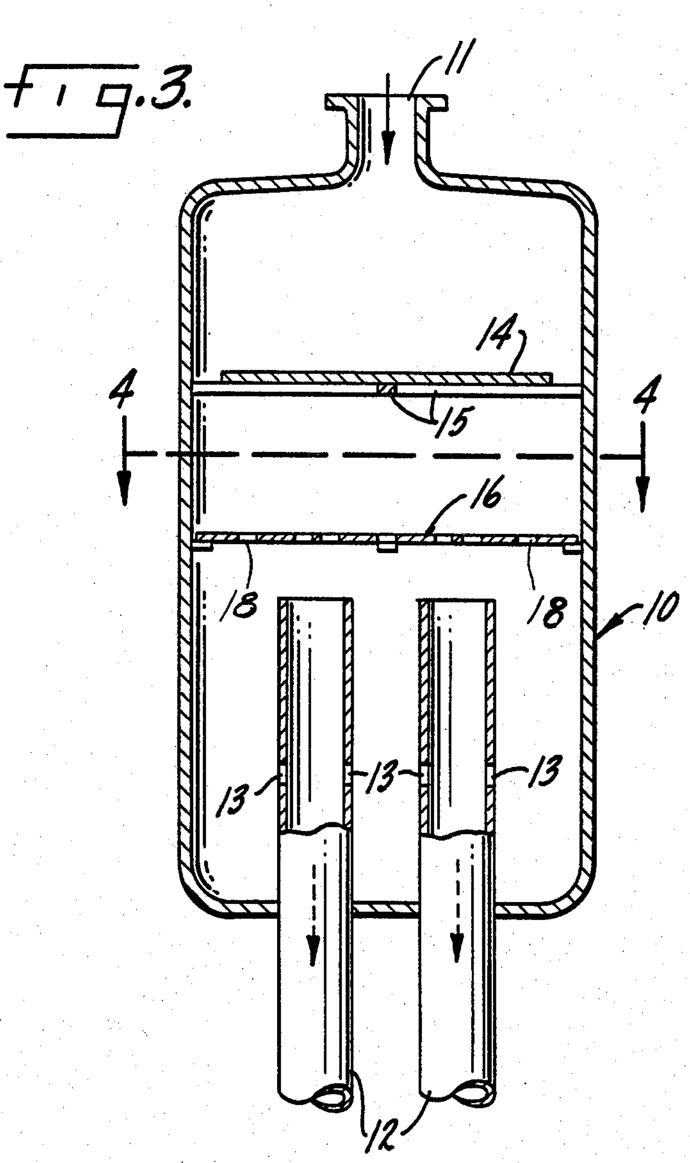
FIG. 3 is a side elevational view in section of another embodiment of the apparatus of the present invention.
Figure 4:
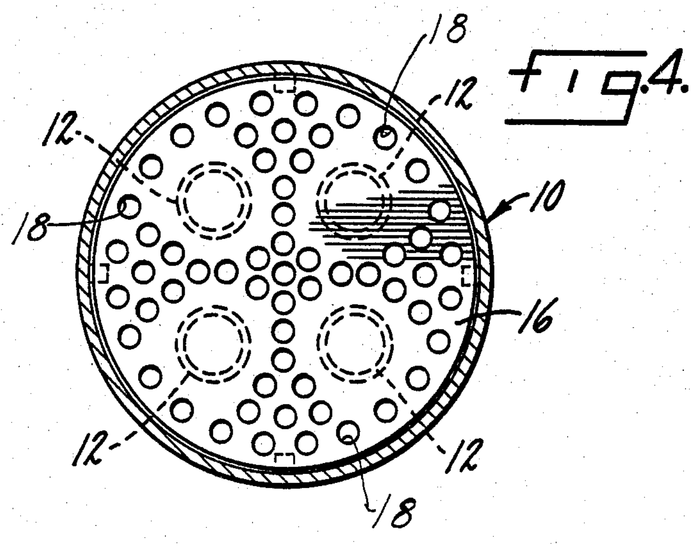
FIG. 4 is a top sectional view along line 4—4 of FIG. 3.

In the embodiment shown in FIGS. 3 and 4, the plate means comprises a perforated tray 16 supported above the top openings of the pipe means 13. Thus, the solid portion of the perforated tray 16 further restricts the flow of fluid directly into the top openings of the pipe means 13. This perforated tray 16 includes perforations 18, which permit the fluid to flow therethrough.

In use, a fluid comprising a mixture of liquid, preferably a major portion by weight of liquid, and vapor enters hollow vessel 10 through inlet means 11. The incoming fluid impinges upon splash baffle 14 and is thereby at least partially restricted from entering the top opening of pipe means 12 directly from the inlet means 11. Splash baffle 14 also acts to reduce the kinetic energy of the incoming fluid which improves the distribution efficiency of the present apparatus. The fluid then proceeds in a generally downwardly direction toward plate means 16. The vapor in the incoming fluid passes around plate means 16 and enters the hollow space of pipe means 12 through the top openings of pipe means 12. At least a portion, and preferably a major portion, of the liquid in the incoming fluid proceeds down past the top openings of pipe means 12 and accumulates at or, preferably, above the level of the apertures 13. After the liquid accumulates to a certain point at or, preferably, above the level of the apertures 13, the liquid flows through the apertures 13 into the hollow space of pipe means 12 where it is combined with vapor which entered the hollow space through the top openings of pipe means 12. The thus distributed liquid-vapor mixture flows through the hollow space of pipe means 12 into, for example, the two passes of direct fired heater 20 or different chemical reaction zones 22. The double restricting action of splash baffle 14 and plate means 16 provides for improved operation of the present apparatus since, for example, the effect of surges of fluid, i.e., liquid and vapor, through inlet means 11 are minimized thus allowing a reasonably constant level of accumulated liquid to be maintained. This, in turn, allows more constant liquid flow rates through each pipe means and, for example, to each pass of the heat exchanger or to each chemical reaction zone, thus providing improved distribution.

As noted above, it is preferred that the liquid in the vessel be made to accumulate to a level above the apertures in the pipe means. In many instances, a liquid level in the range from about 1 inch to about 12 inches above the top of the apertures is especially preferred.

Although the present apparatus and method can be used to distribute fluid comprising a liquid-vapor mixture into two or more separate streams for more effective processing in any equipment downstream of the present apparatus, the present invention finds particular applicability in distributing fluid through multi-pass heat exchanger systems and most particularly, through multi-pass direct fired heaters used, for example, in petroleum and petrochemical processing. The term "direct fired heater" refers to a heater in which the fluid is present in tubes in the immediate vicinity of which combustion, e.g., of natural gas, hydrocarbon fuel oil and the like, takes place. A significant portion of the heat exchange in such a system occurs by radiation. If a multi-pass direct fired heater system is employed, good distribution of liquid-vapor mixtures is necessary in order, for example, to provide efficient heat exchange and to avoid local hot spots on tubes which can lead to damage to or even destruction of the heater system.

In a direct fired heater system, tube temperatures may normally range from about 500° F. to about 1600° F. The fluid comprising a liquid may enter the multi-pass direct fired heater at a wide variety of temperatures, for example, from about 100° F. or less to about 1000° F. or more. At least a portion of the liquid in the fluid is preferably vaporized by the heat transmitted in the direct fired heater. The fluid leaving the tubes of the direct fired heater typically has a temperature ranging from about 200° F. or less to about 1500° F. or more. The amount of heat transferred to the fluid in such a direct fired heater system may typically range from 0.5 million BTU/hour or less to about 250 million BTU/hour or more. Tube side pressure drop (from entrance to exit) in a direct fired heater system typically is in the range from about 0.5 psi. to about 100 psi. or more. Operating pressures on the tube side of such a system may range from about 15 psi. or less to about 5000 psi. or more.

Further, as noted previously, the invention finds particular applicability in distributing a liquid-vapor mixture through a plurality of chemical reaction zones, such as catalytic chemical reaction zones used, for example, in chemical, petroleum and petrochemical processing. By "chemical reaction zone" is meant a space in which at least one chemical reaction takes place. A catalyst to promote chemical reaction may or may not be present in the chemical reaction zone. The catalyst may be homogeneous or heterogeneous. Often, the chemical reaction zones comprise walled vessels which are at least partially filled with at least one bed of solid particulate catalyst material. The desired conditions, e.g., temperature, pressure and the like, within the chemical reaction zone are dependent, for example, on the particular chemical reaction or reactions which are to take place. Such reaction conditions are often conventional and well known in the art.

Typical among the chemical reactions which take place in the present chemical reaction zones include hydrocarbon reactions such as isomerization, reforming, cracking, polymerization, alkylation, dealkylation, hydrogenation, dehydrogenation, hydrocracking and the like.

From the above, it is clear that the present apparatus and method may be used in conjunction with a wide variety of heat exchanger systems, e.g., multi-pass direct fired heaters, and/or chemical reaction zones. Of course, the present invention may also be used to distribute fluid into two or more separate streams for downstream processing in other equipment as well. The present invention does provide improved means for achieving effective distribution of a fluid comprising a liquid-vapor mixture into two or more separate streams. For example, the apparatus described above requires few, if any, moving parts and, therefore, should require only infrequent maintenance.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A method for distributing a mass of fluid comprising a liquid-vapor mixture into at least two (2) separate streams which comprises:

A. providing an apparatus comprising:

1. a hollow vessel having at least one fluid inlet means;
2. at least two hollow distributor pipe means each having a top opening located at a first end of said pipe means which extends into said vessel, each of said pipe means providing outlet means from said vessel for a different portion of said fluid, provided that said fluid inlet means is located at a level above said top openings of said pipe means;
3. at least one aperture located in that part of each said pipe means extending into said vessel below said first end of said pipe means to provide fluid communication between the interior of said vessel and the hollow space of said pipe means;

and 4. restrictive means located within said hollow vessel at a level above the top openings of said pipe means to restrict the flow of fluid from said fluid inlet means directly into the hollow space of said pipe means through the top openings of said pipe means; and B. causing said fluid to enter said vessel through said fluid inlet means and forming a liquid level up to at least the level of said aperture whereby at least a major portion of said liquid enters said pipe means through said aperture.

2. The method of claim 1 wherein said apparatus further comprises plate means located above said top openings of said pipe means to further restrict the flow of fluid directly into said top openings of said pipe means.

3. The method of claim 1 wherein said fluid inlet means is located at a level above said top openings of said pipe means.

4. The method of claim 3 wherein said fluid inlet means is located at a level above said restrictive means.

5. The method of claim 4 wherein said restrictive means is located at a level between said top openings of said pipe means and said fluid inlet means.

6. The method of claim 5 wherein each said pipe means has from 1 to about 20 apertures located therein.

7. The method of claim 5 wherein said apparatus further comprises plate means located between said top openings of said pipe means and said restrictive means to further restrict the flow of fluid directly into said top openings of said pipe means.

8. The method of claim 7 wherein said pipe means are at least about 4 in number, and said plate means comprises a perforated tray supported above the top openings of said pipe means, said perforated tray containing at least one perforation therethrough.

9. A distribution apparatus for distributing a mass of fluid comprising a liquid-vapor mixture into at least two separate streams each of which flows to a different chemical reaction zone which comprises:

1. a hollow vessel having at least one fluid inlet means
2. at least two hollow distributor pipe means each having a top opening located at a first end of said pipe means which extends into said vessel, each of said pipe means providing outlet means from said vessel for a different portion of said fluid each of said pipe means being in fluid communication with a different chemical reaction zone;
3. at least one aperture located in that part of each said pipe means extending into said vessel below said first end of said pipe means to provide fluid communication between the interior of said vessel and the hollow space of said pipe means; and
4. restrictive means located at a level above the top openings of said pipe means to restrict the flow of fluid from said fluid inlet means directly into the hollow space of said pipe means through the top openings of said pipe means.

10. The apparatus of claim 9 wherein said pipe means are at least about 4 in number, and said plate means comprises a perforated tray supported above the top openings of said pipe means, said perforated tray containing at least one perforation therethrough.

11. A method for distributing a mass of fluid comprising a liquid-vapor mixture through a heat exchanger having at least four passes comprising:

1. providing said heat exchanger with the apparatus of claim 10; and
2. causing said fluid to enter said vessel through said fluid inlet means and forming a liquid level above the level of said aperture whereby at least a major portion of said liquid enters said pipe means through said aperture.

12. The apparatus of claim 9 wherein said fluid inlet means is located at a lever above said top openings of said pipe means.

13. The apparatus of claim 12 wherein said fluid inlet means is located at a level above said restrictive means.

14. The apparatus of claim 13 wherein said restrictive means is located at a level between said top openings of said pipe means and said fluid inlet means.

15. The apparatus of claim 14 wherein each said pipe means has from 1 to about 20 apertures located therein, and the cross-sectional area of said top opening of each said pipe means is of substantially the same size and is at substantially the same horizontal level.

16. The apparatus of claim 15 which further comprises plate means located between said top openings of said pipe means and said restrictive means to further restrict the flow of fluid directly into said top openings of said pipe means.

17. A method for distributing a mass of fluid comprising a liquid-vapor mixture to a plurality of chemical reaction zones comprising:

1. providing a plurality of chemical reaction zones with the apparatus of claim 15; and
2. causing said fluid to enter said vessel through said fluid inlet means and forming a liquid level up to at least the level of said aperture whereby at least a major portion of said liquid enters said pipe means through said aperture.

18. The apparatus of claim 9 which further comprises plate means located above said top openings of said pipe means to further restrict the flow of fluid directly into said top openings of said pipe means.

19. A method for distributing a mass of fluid comprising a liquid-vapor mixture to a plurality of chemical reaction zones comprising:

1. providing a plurality of chemical reaction zones with the apparatus of claim 18; and
2. causing said fluid to enter said vessel through said fluid inlet means and forming a liquid level up to at least the level of said aperture whereby at least a major portion of said liquid enters said pipe means through said aperture.

20. The apparatus of claim 9 wherein said pipe means are at least about 4 in number, and said plate means comprises a perforated tray supported above the top openings of said pipe means, said perforated tray containing at least one perforation therethrough.

21. A method for distributing a mass of fluid comprising a liquid-vapor mixture to a plurality of chemical reaction zones comprising:

1. providing a plurality of chemical reaction zones with the apparatus of claim 20; and
2. causing said fluid to enter said vessel through said fluid inlet means and forming a liquid level up to at least the level of said aperture whereby at least a major portion of said liquid enters said pipe means through said aperture.

22. A method for distributing a mass of fluid comprising a liquid-vapor mixture to a plurality of chemical reaction zones comprising: 1. providing a plurality of chemical reaction zones with the apparatus of claim 9; and 2. causing said fluid to enter said vessel through said fluid inlet means and forming a liquid level up to at least the level of said aperture whereby at least a major portion of said liquid enters said pipe means through said aperture.

* * * * *